US010763628B2

(12) United States Patent
Shimoda et al.

(10) Patent No.: US 10,763,628 B2
(45) Date of Patent: Sep. 1, 2020

(54) CONNECTION MODULE (71) Applicants: AUTONETWORKS TECHNOLOGIES, LTD., Mie (JP); SUMITOMO WIRING SYSTEMS, LTD., Mie (JP); SUMITOMO ELECTRIC INDUSTRIES, LTD., Osaka (JP)

(72) Inventors: Hiroki Shimoda, Mie (JP); Shinichi Takase, Mie (JP); Nobuyuki Matsumura, Mie (JP); Yoshinori Ito, Mie (JP)

(73) Assignees: AUTONETWORKS TECHNOLOGIES, LTD., Mie (JP); SUMITOMO WIRING SYSTEMS, LTD., Mie (JP); SUMITOMO ELECTRIC INDUSTRIES, LTD., Osaka (JP)

( * ) Notice: Subject to any disclaimer, the term of this patent is extended or adjusted under 35 U.S.C. 154(b) by 56 days.

(21) Appl. No.: 16/094,112

(22) PCT Filed: Apr. 13, 2017

(86) PCT No.: PCT/JP2017/015066
§ 371 (c)(1),
(2) Date: Oct. 16, 2018

(87) PCT Pub. No.: WO2017/187996
PCT Pub. Date: Nov. 2, 2017

(65) Prior Publication Data
US 2019/0109423 A1 Apr. 11, 2019

(30) Foreign Application Priority Data
Apr. 26, 2016 (JP) .................. 2016-087911

(51) Int. Cl.
*H01M 2/30* (2006.01)
*H01R 25/16* (2006.01)
(Continued)

(52) U.S. Cl.
CPC ............. *H01R 25/162* (2013.01); *H01G 2/04* (2013.01); *H01G 11/10* (2013.01); *H01M 2/206* (2013.01);
(Continued)

(58) Field of Classification Search
CPC .................... H01M 2/202; H01M 2/30
See application file for complete search history.

(56) References Cited

U.S. PATENT DOCUMENTS 6,261,719 B1    7/2001  Ikeda et al.
2014/0113494 A1* 4/2014  Kinoshita ........... H01M 2/1061
                                                   439/627

FOREIGN PATENT DOCUMENTS

JP     2000-149909    5/2000
JP     2012-164437    8/2012
(Continued)

OTHER PUBLICATIONS

Official Communication issued in International Bureau of WIPO Patent Application No. PCT/JP2017/015066, dated Jun. 6, 2017.

*Primary Examiner* — Olatunji A Godo
(74) *Attorney, Agent, or Firm* — Greenblum & Bernstein, P.L.C.

(57) ABSTRACT

A connection module includes a plurality of bus bars that connect positive and negative electrode terminals of adjacent energy storage elements, a plurality of bus bar holding portions that hold bus bars in an insulated manner, and a pitch adjustment portion. The pitch adjustment portion is to be provided across the adjacent bus bar holding portions so as to couple the adjacent bus bar holding portions, and (Continued)

extends and contracts in a line-up direction of the plurality of bus bar holding portions so as to enable adjustment of a pitch between the positive and negative electrode terminals of the adjacent energy storage elements. Each of the bus bar holding portion includes a bus bar housing portion including an isolation wall that keeps the corresponding bus bars apart in an insulated manner. The bus bar housing portion includes, on one side in the line-up direction, a free portion where there is no isolation wall.

10 Claims, 9 Drawing Sheets

(51) Int. Cl.
- *H01G 11/10* (2013.01)
- *H01G 2/04* (2006.01)
- *H01M 2/20* (2006.01)
- *H01M 10/42* (2006.01)
- *H01R 11/28* (2006.01)

(52) U.S. Cl.
CPC ...... *H01M 10/425* (2013.01); *H01M 2220/20* (2013.01); *H01R 11/288* (2013.01)

(56) References Cited

FOREIGN PATENT DOCUMENTS

| | | |
|---|---|---|
| JP | 2015-065055 | 4/2015 |
| JP | 2015-165458 | 9/2015 |

* cited by examiner

FIG.11

CONNECTION MODULE

TECHNICAL FIELD

The present invention relates to a connection module, and more specifically relates to a connection module used for an energy storage module.

BACKGROUND ART

In an energy storage module for vehicles such as a hybrid car and an electric car, a plurality of energy storage elements including positive and negative electrode terminals are lined up, and the electrode terminals of adjacent energy storage elements are connected to each other by bus bars included in a connection module so as to connect the plurality of energy storage elements in series or parallel. Usually, the interval between the electrodes (electrode pitch) of adjacent energy storage element varies, and therefore a technique is known to provide the connection module with a pitch adjustment means that adjusts the electrode pitch by extending and contracting the connection module in the line-up direction of the energy storage elements (see, e.g., Patent Document 1).

CITATION LIST

Patent Document

Patent Document 1: JP 2000-149909A

SUMMARY OF INVENTION

Technical Problem

However, with the battery connection plate (connection module) described in Patent Document 1 above, the pitch adjustment means is provided at a common substrate portion for every predetermined number of connection portions (bus bars). Accordingly, a sufficient extension/contraction amount, or in other words, a sufficient pitch adjustment amount, in the line-up direction of the energy storage element provided by the pitch adjustment means cannot be always ensured for each bus bar.

Therefore, a connection module that can increase the pitch adjustment amount for each bus bar by using a simple structure is provided herein.

Solution to Problem

A connection module disclosed herein is a connection module to be attached to an energy storage element group in which a plurality of energy storage elements including positive and negative electrode terminals are lined up, the connection module including: a plurality of bus bars that connects the positive and negative electrode terminals of adjacent ones of the plurality of energy storage elements; a plurality of bus bar holding portions that are lined up in a line-up direction of the plurality of energy storage elements so as to hold the bus bars in an insulated manner; and a pitch adjustment portion that is to be provided across adjacent ones of the bus bar holding portions so as to couple the adjacent bus bar holding portions, and that extends and contracts in the line-up direction of the plurality of bus bar holding portions so as to enable adjustment of a pitch between the positive and negative electrode terminals of the adjacent energy storage elements, wherein, each of the bus bar holding portions includes a bus bar housing portion including an isolation wall that keeps the bus bars apart in an insulated manner, and the bus bar housing portion includes, on one side in the line-up direction, a free portion where there is no isolation wall.

With this configuration, the adjacent bus bar holding portions are coupled by the pitch adjustment portion that extends and contracts in the line-up direction of the plurality of bus bar holding portions. That is, the pitch adjustment portion is provided so as to correspond to a location between the bus bars. Also, the bus bar housing portion includes, on one side in the line-up direction, a free portion where there is no isolation wall. That is, one isolation wall of the two isolation walls opposed to the isolation walls of the other adjacent bus bar housing portions is not provided. This can increase the gap between the adjacent bus bar housing portions by an amount corresponding to the thickness of the isolation wall, and by increasing the gap, it is possible to increase the extension/contraction amount of the pitch adjustment portion, or in other words, the pitch adjustment amount. Accordingly, with the connection module of the present configuration, it is possible to increase the pitch adjustment amount for each bus bar, more specifically, between the bus bars by using a simple structure.

In the above-described connection module, each of the bus bar holding portions may include a bottom portion on which the corresponding bus bar is placed, each of the bus bars may be formed in a rectangular shape in plan view, each of the bus bar housing portions may be formed in a U-shape that is open on the one side in the line-up direction in plan view, the isolation wall may includes: a first isolation wall provided upright on the bottom portion and extending in the line-up direction of the plurality of bus bars housing portion; a second isolation wall provided upright on the bottom portion so as to be opposed to the first isolation wall, and extending in the line-up direction; and a third isolation wall coupled to one end portion of the second isolation wall, and extending in a direction orthogonal to the line-up direction, from the one end portion of the second isolation wall toward one end portion of the first isolation wall, and there may be no isolation wall on a side opposed to the third isolation wall.

With this configuration, each of the bus bar housing portions can be formed by the first to third side walls into a U-shape that is open on one side in the line-up direction of the plurality of bus bars housing portion in plan view. That is, a bus bar housing portion including a free portion and capable of housing a bus bar having a rectangular shape in plan view can be suitably formed.

In the above-described connection module, a gap may be provided between the adjacent bus bar housing portions, and the pitch adjustment portion may be formed in a location, in the vicinity of the gap, of the bottom portions of the adjacent bus bar holding portions by a hinge provided across the gap.

With this configuration, the pitch adjustment portion is provided across ends of the bottom portions located between the first isolation walls of the adjacent bus bar housing portions, and it is therefore possible to make maximum use of the extension/contraction operation of the pitch adjustment portion. This can reliably increase the pitch adjustment amount as compared with when two side walls that are opposed to the housing walls of the other adjacent bus bar housing portions are provided.

In the above-described connection module, at least one of the first isolation wall and the second isolation wall may include a movement limiting portion that limits movement of the bus bar and that is disposed on the third isolation wall side relative a center part in the line-up direction, and the bus bar may includes an engaging portion for being engaged with the movement limiting portion.

With this configuration, by the engaging portion of the bus bar being engaged with the movement limiting portion formed at least one of the first isolation wall and the second isolation wall, the movement of the bus bar to the free portion side of the bus bar housing portion where the isolation wall is not formed is limited. This prevents the detachment of the bus bar from the bus bar housing portion during transport of the connection module, and facilitates the operation of attaching the bus bar to the electrode terminal, thus improving the operation efficiency.

Advantageous Effects of Invention

With the connection module according to the present invention, it is possible to increase the pitch adjustment amount for each bus bar by using a simple structure.

DESCRIPTION OF EMBODIMENTS

Embodiment

An embodiment of the present invention will be described with reference to FIGS. 1 to 11.

Figure 1:
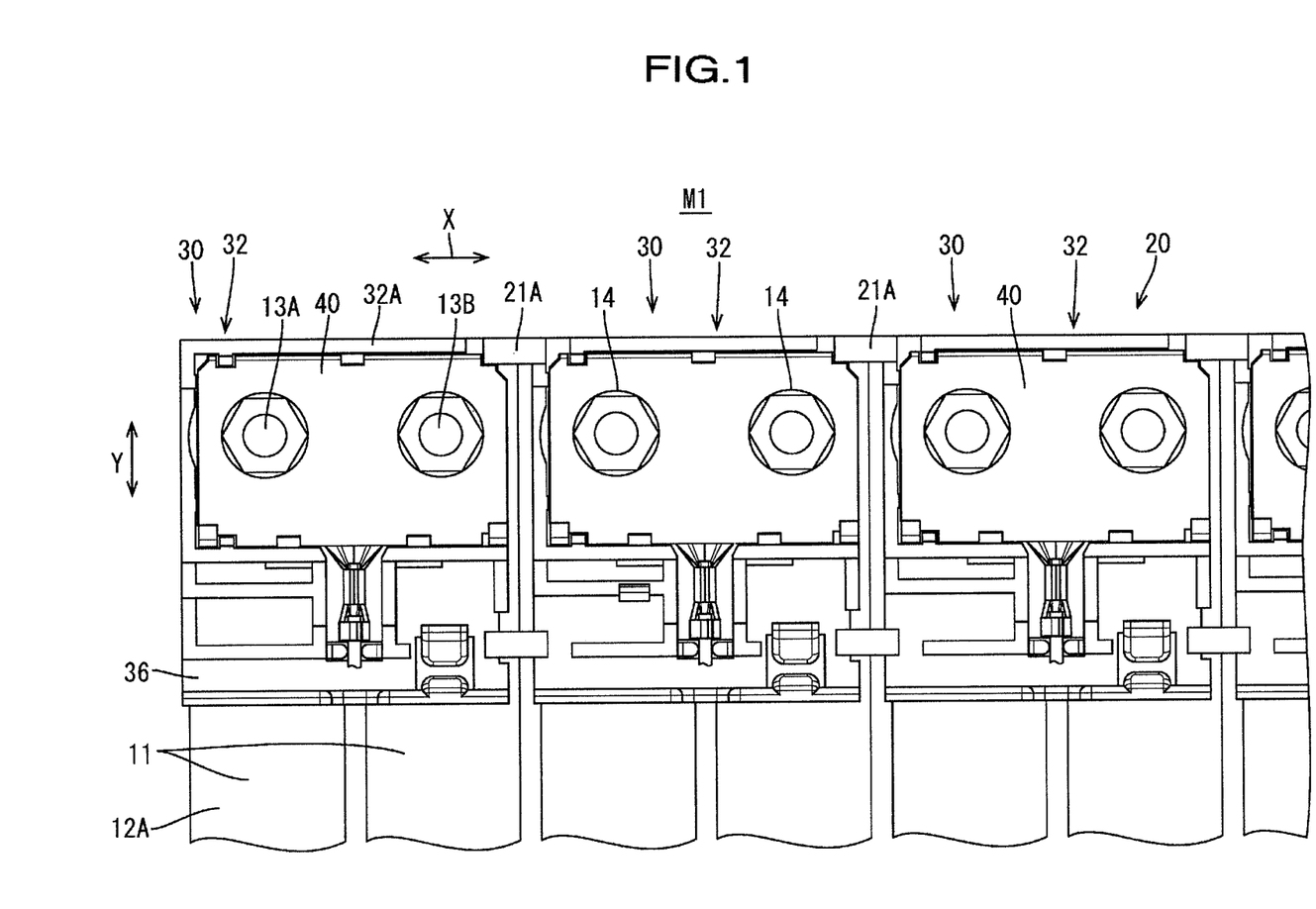
FIG. 1 is a partial plan view showing an energy storage module including a connection module according to an embodiment.

As shown in FIG. 1, an energy storage module M1 includes a connection module 20 according to the present embodiment, and an energy storage element group 10 in which a plurality of energy storage elements 11 that are lined up.

The energy storage module M1 is used, for example, as a driving source for a vehicle such as an electric car or a hybrid car. In the following description, for a plurality of identical members, a reference numeral may be assigned to only one member, and reference numerals omitted for the other members.

1. Energy Storage Element Group

Figure 2:
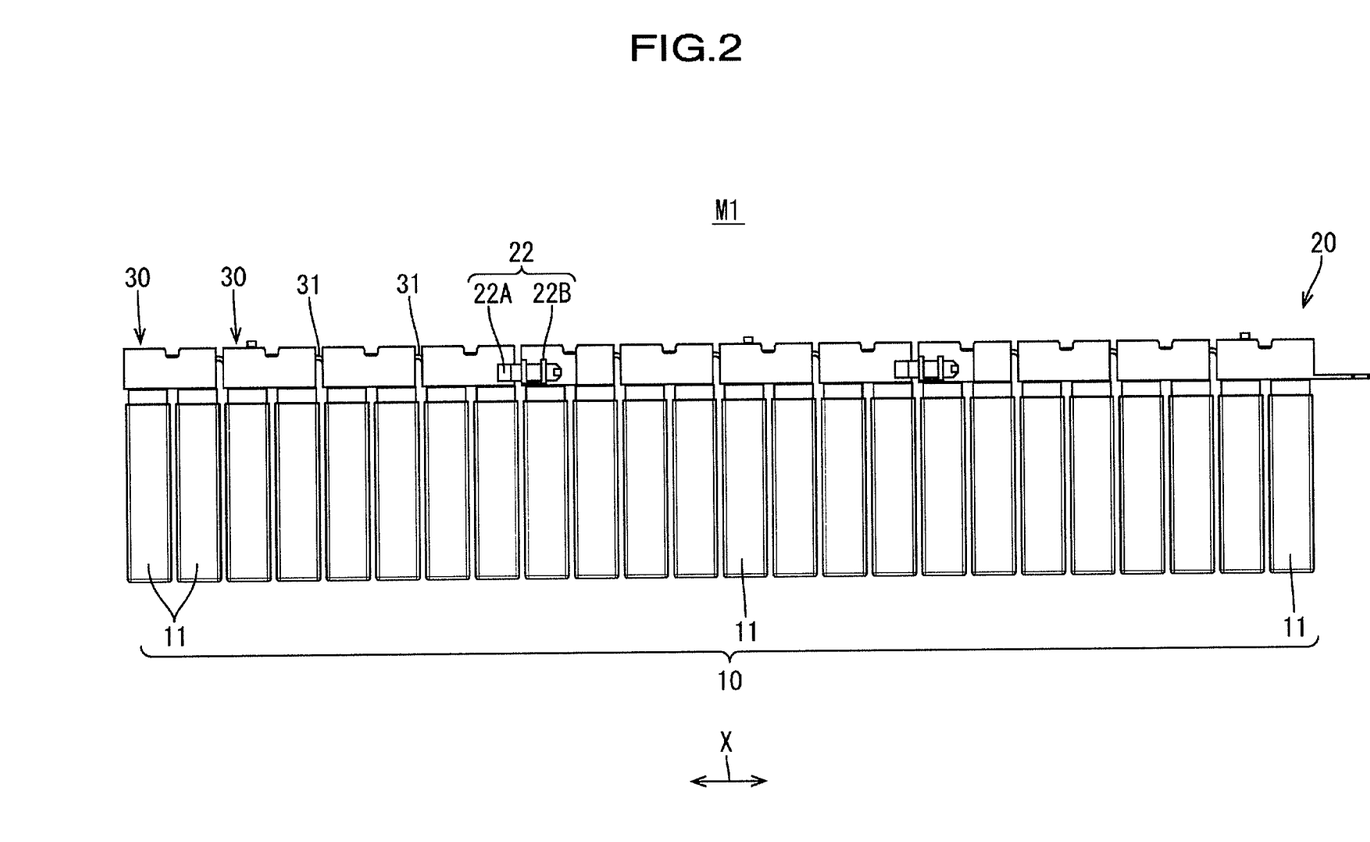
FIG. 2 is a front view of the energy storage module.

As shown in FIGS. 1 and 2, the energy storage element group 10 to which the connection module 20 according to the present embodiment is to be attached is configured by arranging a plurality of (in the present embodiment, 24) energy storage elements 11.

Each energy storage element 11 includes a cylindrical positive electrode terminal 13A protruding perpendicularly upward from an upper face 12A of a flat rectangular solid-shaped body portion in which an energy storage element (not shown) is housed, and a negative electrode terminal 13B. Each of the electrode terminals 13 is configured such that a terminal insertion hole 42 (see FIG. 7) of a bus bar 40 is inserted therethrough. Note that only one of the electrode terminals 13A, 13B provided at opposite end portions of the energy storage element 11 in the longitudinal direction (the arrow Y direction in FIG. 1) is shown in FIG. 1, and the other electrode terminal is not shown.

On the side wall portion of the electrode terminal 13, a thread (not shown) onto which a nut 14 can be screwed is formed. As a result of screwing the nut 14 to the electrode terminal 13, the bus bar 40 and the electrode terminal 13 are electrically connected. The plurality of energy storage elements 11 are disposed such that the electrode terminals 13 that are adjacent in the left-right direction (the arrow X direction) in FIG. 2 have opposite polarities. Although not shown in FIG. 1, a connection module 20 is also attached at a lower end of the energy storage element 11 in the arrow Y direction in FIG. 1, and the adjacent electrode terminals located at the lower end are also connected by the bus bar 40.

2. Connection Module

Figure 3:
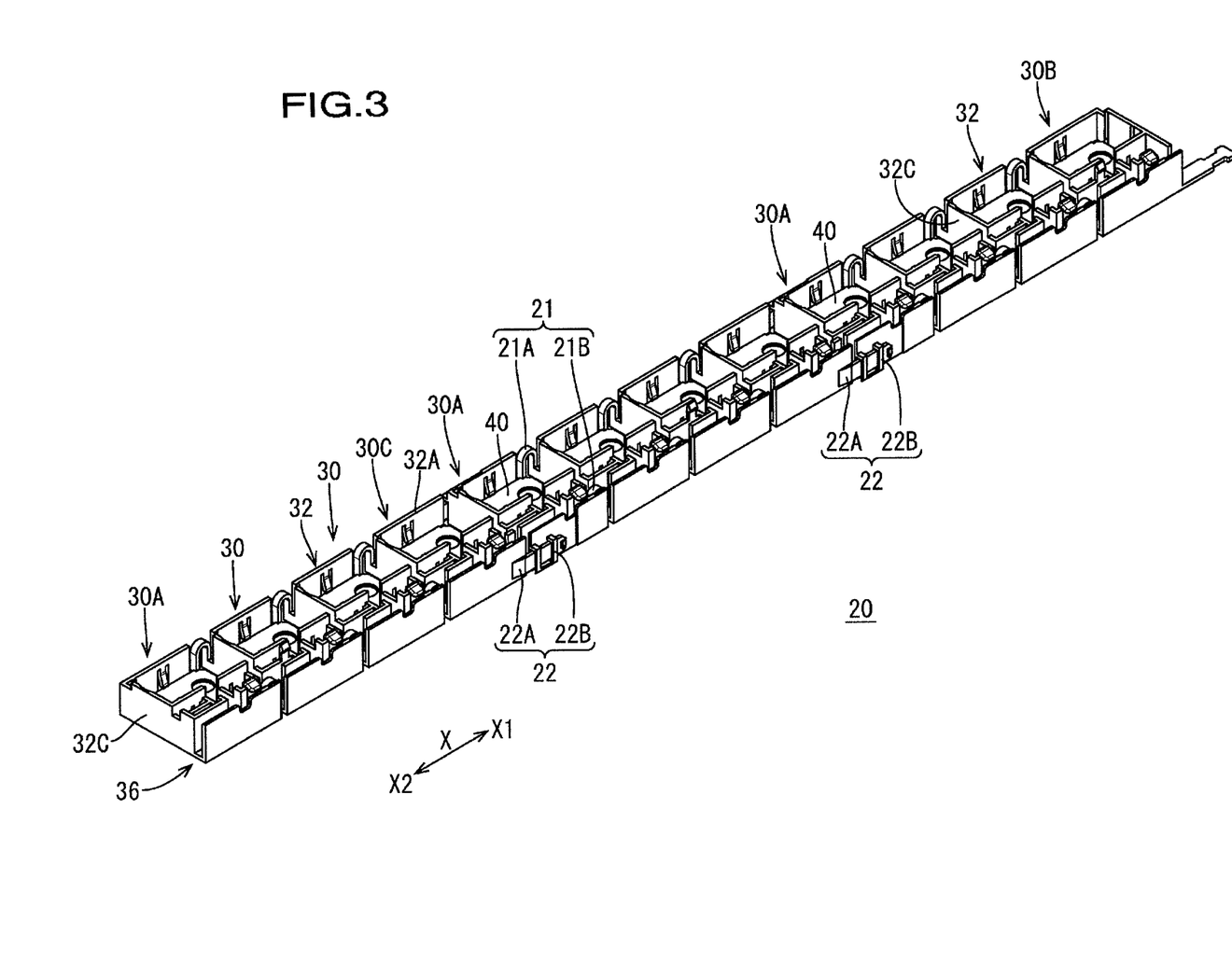
FIG. 3 is a perspective view showing a connection module according to an embodiment.

As shown in FIGS. 1 and 2, the connection module 20 is attached to the energy storage element group 10 along the line-up direction (the arrow X direction) of the energy storage elements 11, and has the function of electrically connecting the plurality of energy storage elements 11. As shown in FIG. 3, the connection module 20 includes a plurality of (in the present embodiment, 12) bus bar holding portions 30, a plurality of (in the present embodiment, 12) bus bars 40, and a hinge 21. Note that the connection module 20 shown in FIG. 3 represents only the connection module provided at one end portion (upper end portion) of the energy storage elements 11 of the energy storage element group 10 in the longitudinal direction (the arrow Y direction in FIG. 1). However, as described above, the same connection module as the connection module 20 shown in FIG. 3 is also provided at the other end portion (lower end portion) of the energy storage elements 11 of the energy storage element group 10 in the longitudinal direction (the arrow Y direction in FIG. 1).

As shown in FIG. 3, in the connection module 20 of the present embodiment, for example, groups of four bus bar holding portions 30 each for individual units. Therefore, the connection module 20 of the present embodiment is composed of three units. The units are coupled by unit coupling portions 22 so as to enable adjustment of the unit interval (i.e., the bus bar interval), and each of the unit coupling portions 22 includes a unit engaging portion 22A and a unit engagement receiving portion 22B. Note that the bus bar holding portions 30A, 30B at opposite end portions of the connection module 20 and the bus bar holding portions 30A, 30C at opposite end portions of each unit are partly different in configuration from the bus bar holding portion 30 at the central portion. Therefore, portions common to the bus bar holding portions will be described below, taking the bus bar holding portion 30 as an example.

Figure 4:
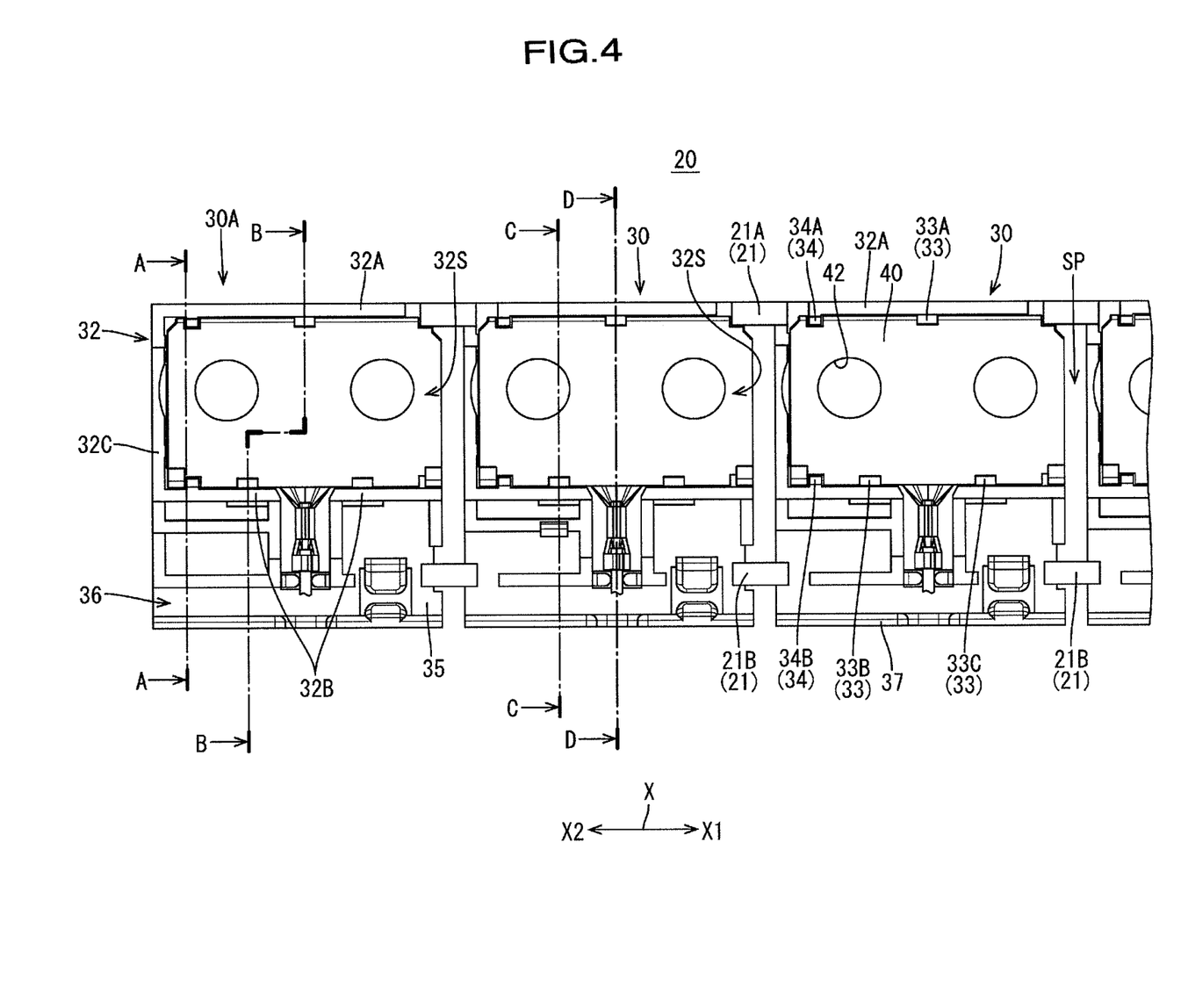
FIG. 4 is an enlarged plan view showing a part of the connection module.
Figure 5:
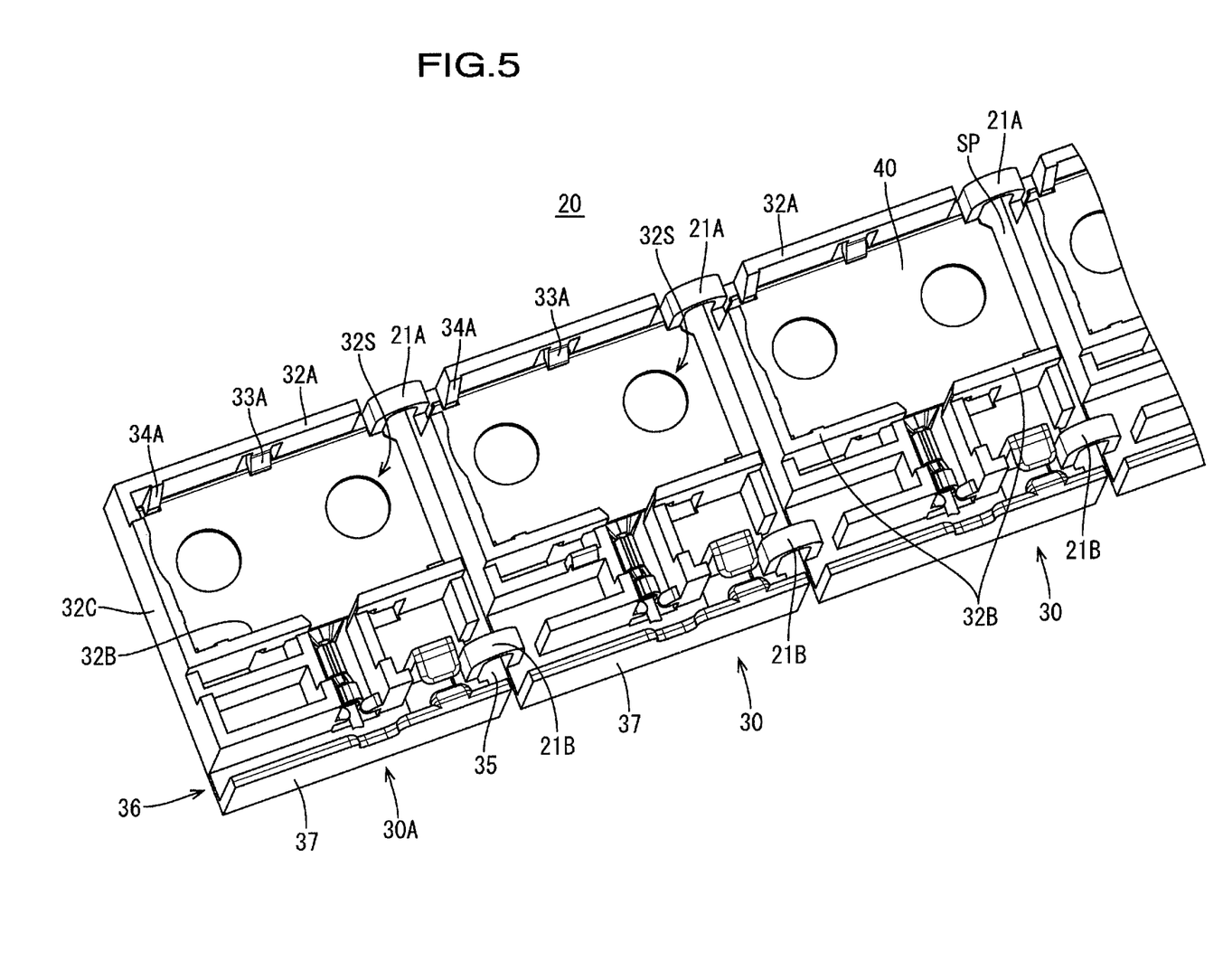
FIG. 5 is an enlarged perspective view showing a part of the connection module.

As shown in FIG. 4, the bus bar holding portions 30 are lined up in the line-up direction (the arrow X direction) of the plurality of energy storage elements 11 so as to hold the bus bars 40 in an insulated manner. Each of the bus bar holding portions 30 includes a bus bar housing portion 32, a bottom portion 35, a wire receiving groove 36, a groove wall portion 37, and an opening portion 38, for example.

Each bus bar housing portion 32 includes three side walls (32A, 32B, 32C) that keep the bus bars 40 apart in an insulated manner. In addition, the bus bar housing portion 32 includes, on one side (in the present embodiment, the right side in FIG. 4: the X1 direction side of the arrow X) in the line-up direction (the arrow X direction) of the plurality of bus bar holding portions 30, a free portion 32S where there is no isolation wall. That is, the bus bar housing portion 32 is formed in a U-shape that is open on one side (the right side in FIG. 4) in the line-up direction (hereinafter referred to as the "holding portion arrangement direction") of the bus bar holding portion 30 in plan view. Note that the line-up direction (the arrow X direction shown in FIG. 2) of the plurality of energy storage elements 11 and the holding portion arrangement direction (the arrow X direction shown in FIG. 4) are the same direction.

The three side walls (32A, 32B, 32C) include a first side wall (an example of the "first isolation wall") 32A, a second side wall (an example of the "second isolation wall") 32B, and a third side wall (an example of the "third isolation wall") 32C. The first side wall 32A is provided upright at an end placement portion 35B, which constitutes a part of the bottom portion 35, and extends in the holding portion arrangement direction (the arrow X direction). The second side wall 32B is provided upright at an end placement portion 35C, which constitutes a part of the bottom portion 35 and is opposed to the end placement portion 35B, so as to be opposed to the first side wall 32A, and extends in the holding portion arrangement direction (the arrow X direction). The third side wall (an example of the "third isolation wall") 32C is coupled to one end portion of the second side wall 32B, and extends in a direction (the arrow Y direction in FIG. 4) orthogonal to the holding portion arrangement direction, from the one end portion of the second side wall toward one end portion of the first side wall 32A. The side wall on the side opposed to the third side wall 32C is omitted, forming a free portion 32S.

The first side wall 32A includes a first deflectable locking pawl 33A and a first fixed locking pawl 34A. The first deflectable locking pawl 33A is formed so as to be deflectable at a part of the first side wall 32A that corresponds to a central placement portion 35A, which constitutes a part of the bottom portion 35, and mainly limits the movement of the bus bar 40 in the vertical direction. An escape space 39A to which the locking pawl 33A can escape is provided around the first deflectable locking pawl 33A (see FIG. 6). On the other hand, the first fixed locking pawl 34A is disposed so as to be fixed on the third side wall side relative to the center portion of the first side wall 32A in the holding portion arrangement direction (the arrow X direction) (see FIG. 6), and mainly limits the movement of the bus bar 40 in the horizontal direction. The first fixed locking pawl 34A is an example of the movement limiting portion.

Likewise, the second side wall 32B includes a second deflectable locking pawl 33B, a third deflectable locking pawl 33C, and a second fixed locking pawl 34B. Note that a cut-out opening portion 32BC for placing a barrel portion 43 (see FIG. 7) of the bus bar 40 is formed at a part of the second side wall 32B that corresponds to the central placement portion 35A (see FIG. 6). In other words, the second side wall 32B is divided by the cut-out opening portion 32BC.

The bottom portion 35 is provided at a lower portion of the bus bar holding portion 30, and forms, in the bus bar housing portion 32, a central placement portion 35A and an end placement portion 35B on which the bus bar 40 is to be placed.

The wire receiving groove 36 is a groove for receiving, for example, a detection line 25 that detects the voltage of the energy storage element 11 and is connected to the bus bar 40 via the barrel portion 43, and the wire receiving groove 36 is formed by the bottom portion 35, the groove wall portion 37, and so forth.

Figure 6:
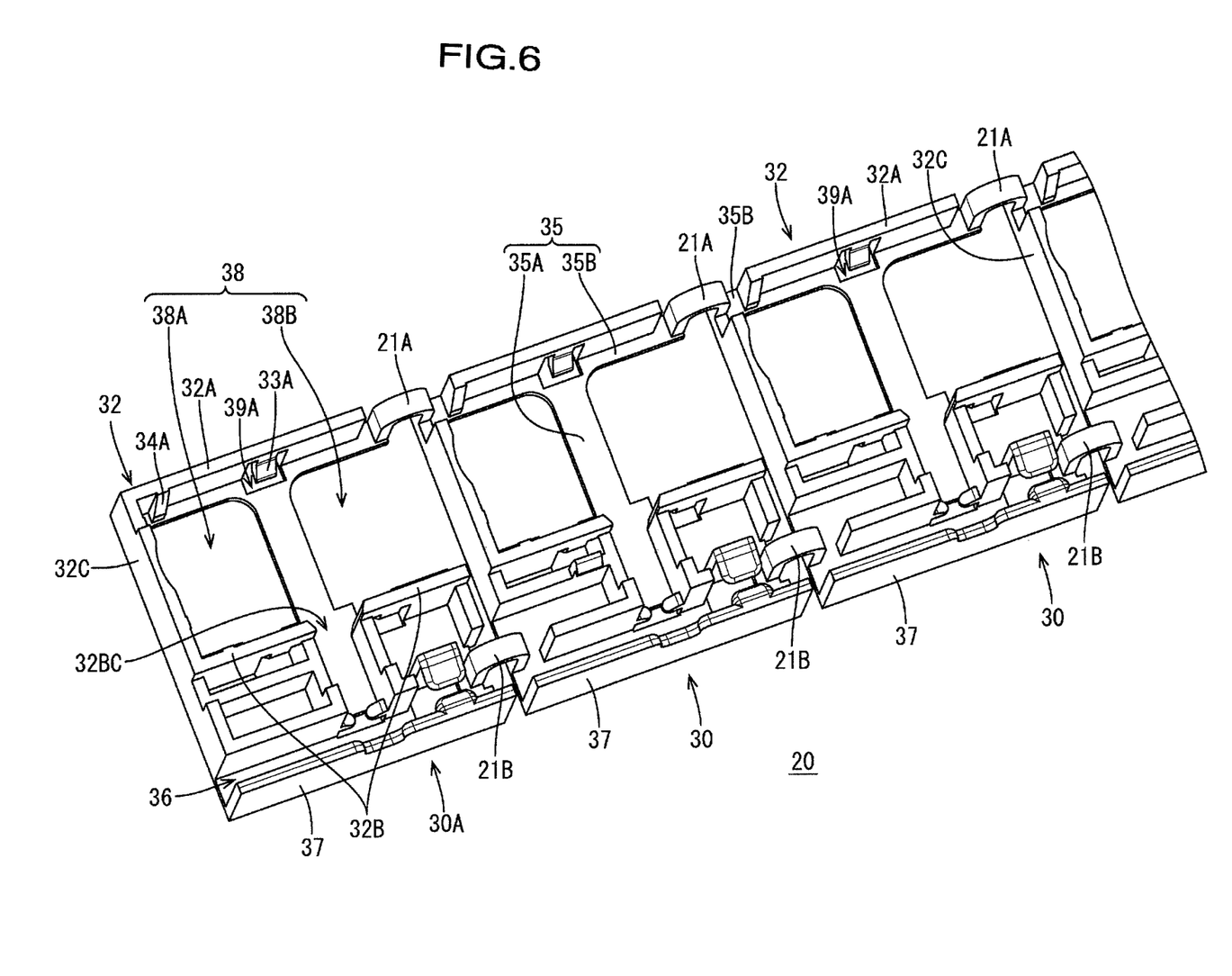
FIG. 6 is an enlarged perspective view showing a part of the connection module except for bus bars.

As shown in FIG. 6, the opening portion 38 (38A, 38B) is formed on the left or right side of the central placement portion 35A of the bottom portion 35, and the electrode terminal (13A, 13B) and the bus bar 40 are connected to each other via the opening portion (38A, 38B).

The hinge 21 (21A, 21B) is provided across the adjacent bus bar holding portions 30, coupling the adjacent bus bar holding portions 30, and extends and contracts in the holding portion arrangement direction (the arrow X direction), enabling adjustment of the pitch (hereinafter referred to as an "inter-electrode pitch") between the electrode terminals (13A, 13B) of the positive and negative electrodes of the adjacent energy storage elements 11. That is, when the inter-electrode pitch is smaller than a standard value, the hinge 21 contracts, narrowing the gap SP between the adjacent bus bar holding portions 30. On the other hand, when the inter-electrode pitch is larger than the standard value, the hinge 21 extends, widening the gap SP. Consequently, the inter-electrode pitch is adjusted. The hinge 21 is an example of the pitch adjustment portion.

As shown in FIG. 4, etc., a first hinge 21A provided across ends of the bottom portions 35 located between the first side walls 32A of the adjacent bus bar housing portions 32, and a second hinge 21B provided across ends of the bottom portions 35 located in the vicinity of the groove wall portions 37 of the adjacent bus bar holding portions 30 are provided as the hinge 21 in the present embodiment. That is, in the present embodiment, the hinges 21 are provided at two locations, namely, an upper end portion and a lower end portion of each bus bar holding portion 30, spanning the gap SP between the adjacent bus bar holding portions 30. In other words, the hinges 21A, 21B are provided at locations in the vicinity of the gap SP between the bus bar holding portions 30 of the bottom portions 35 of the adjacent bus bar holding portions 30, spanning the gap SP.

As shown in FIG. 4, etc., the difference between the bus bar holding portion 30A and the bus bar holding portion 30 lies in that the hinge 21 is not provided on the left side (the arrow X2 side in FIG. 4) of the bus bar holding portion 30A. The difference between the bus bar holding portion 30B and the bus bar holding portion 30 lies in that on the right side (on the arrow X1 side in FIG. 3) of the bus bar holding portion 30A, the side wall is provided, but the hinge 21 is not provided. The difference between the bus bar holding portion 30C and the bus bar holding portion 30 lies in that the hinge 21 is not provided on the right side (the arrow X1 side in FIG. 3) of the bus bar holding portion 30A.

Figure 7:
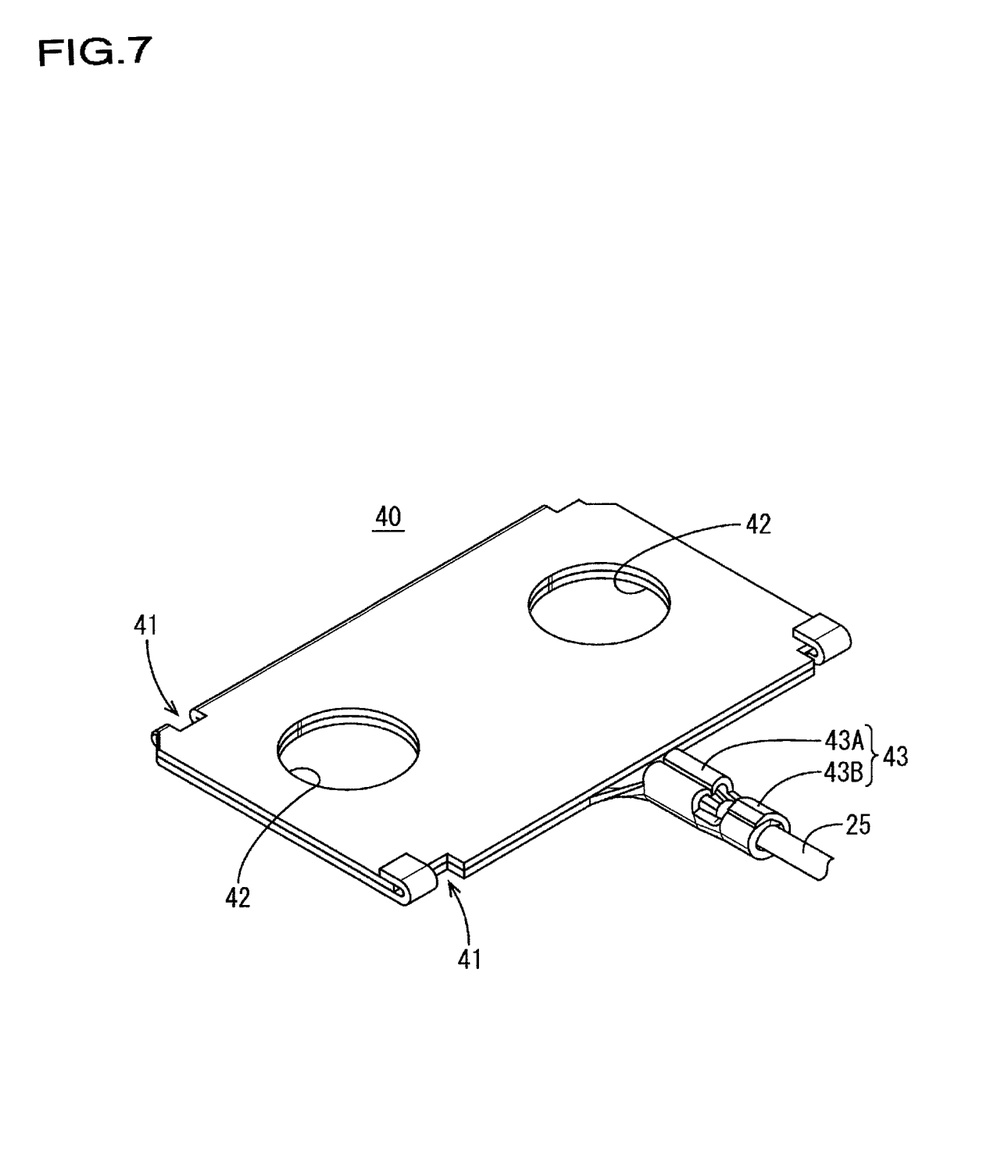
FIG. 7 is a perspective view of a bus bar.
Figure 8:
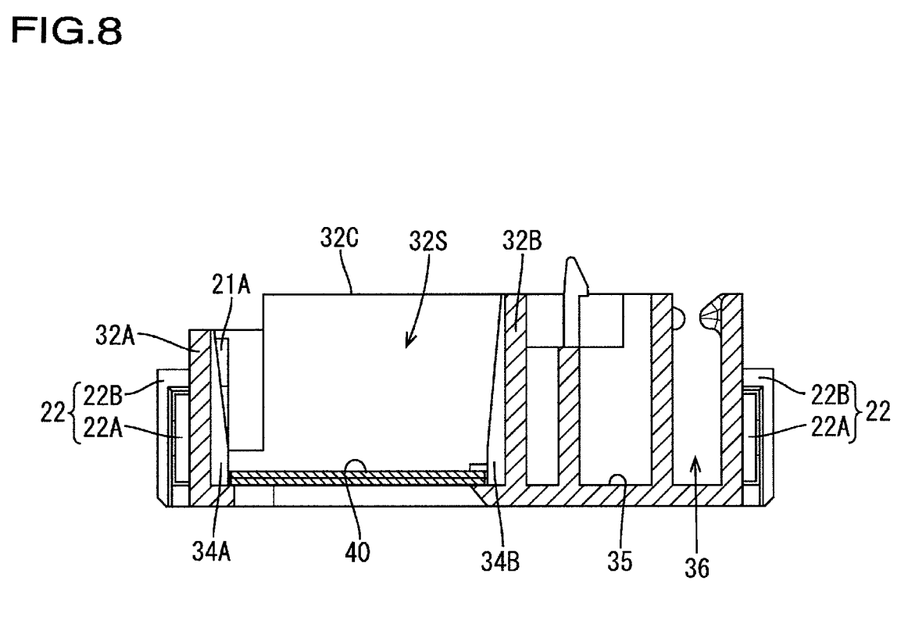
FIG. 8 is a cross-sectional view taken along the line A-A in FIG. 4.
Figure 9:
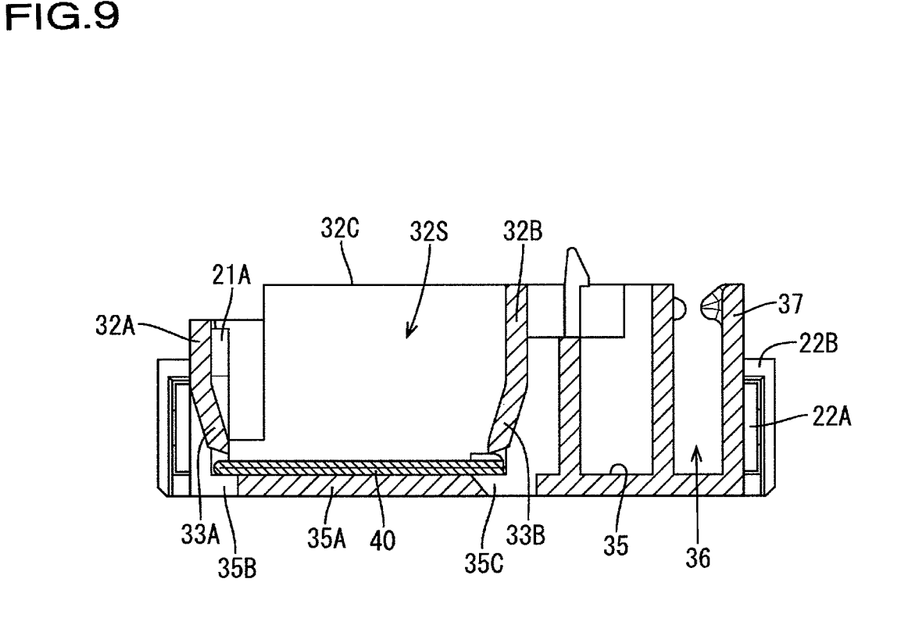
FIG. 9 is a cross-sectional view taken along the line B-B in FIG. 4.
Figure 10:
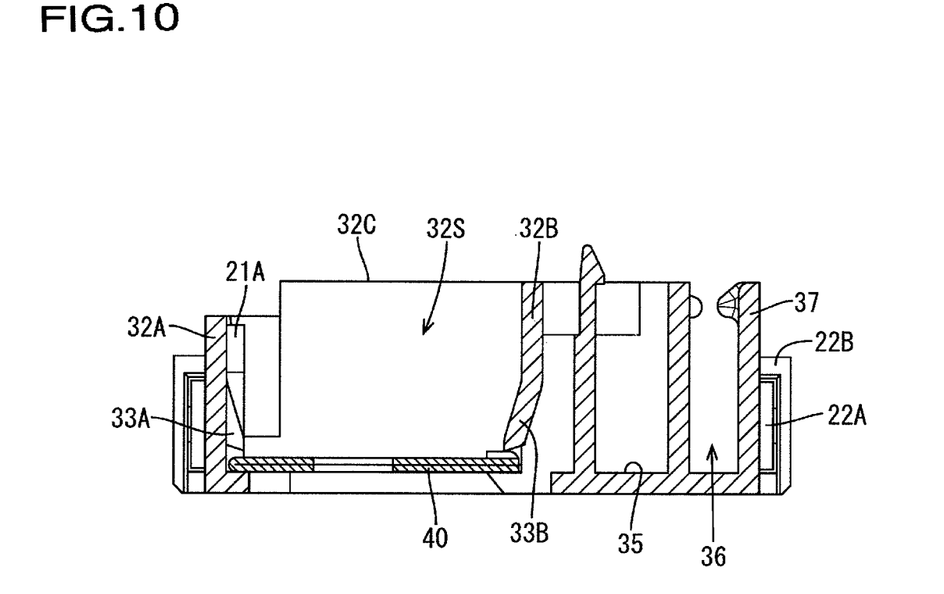
FIG. 10 is a cross-sectional view taken along the line C-C in FIG. 4.
Figure 11:
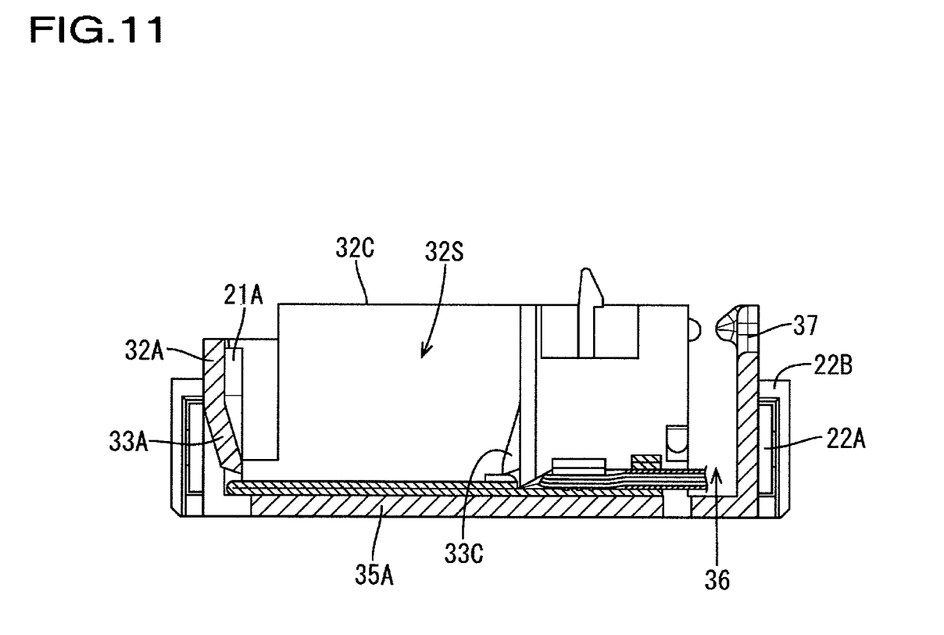
FIG. 11 is a cross-sectional view taken along the line D-D in FIG. 4.

The bus bar 40 is made of a metal such as copper, a copper alloy, stainless steel (SUS), or aluminum, and has a rectangular shape in plan view, as shown in FIG. 7. As shown in FIG. 7, a pair of terminal insertion holes 42 through which the adjacent electrode terminals 13A, 13B can be inserted are formed through the bus bar 40. Each terminal insertion hole 42 has an oblong shape elongated in the line-up direction (the arrow X direction in FIG. 1) of the energy storage element 11.

As shown in FIG. 7, a pair of cut-out portions (an example of the engaging portion) 41 for being engaged with the first fixed locking pawl 34A and the second fixed locking pawl 34B are formed at positions of the bus bar 40 that correspond to the first fixed locking pawl 34A and the second fixed locking pawl 34B of the bus bar housing portion 32. At the center position of one end portion of the bus bar 40 in the width direction, a barrel portion 43 that couples a detection line 25 for detecting the voltage of the energy storage element 11 is formed, for example. The barrel portion 43 includes a wire barrel portion 43A and an insulation barrel portion 43B.

Note that the shape of the bus bar 40 is not limited to the shape shown in FIG. 7. For example, the pair of terminal insertion holes 42 may not be provided. In addition, the shape and the position of the barrel portion 43 may be set freely. Furthermore, the barrel portion 43 may not be provided.

3. Method for Forming Connection Module

Except for the bus bar 40, the connection module 20 is formed by an insulating synthetic resin, and is integrally formed on a unit-by-unit basis, for example, by injection molding using a metal mold. By engaging the unit engaging portions 22A and the unit engagement receiving portions 22B of the units, and housing the bus bars 40 in the bus bar housing portions 32, a connection module 20 as shown in FIG. 3 is formed. Note that two connection modules 20 as shown in FIG. 3 are formed for one energy storage element group 10.

At the time of housing the bus bar 40 in each of the bus bar housing portions 32, end portions of the bus bar 40 come into contact with the three locking pawls 33A, 33B, 33C, and thereby the locking pawls 33A, 33B, 33C are deflected in the directions of the side walls. When the bus bar 40 has been placed on the placement portions 35A, 35B, the locking pawls 33A, 33B, 33C are elastically restored. At this time, the pair of cut-out portions 41 of the bus bar 40 engage with the fixed locking pawls 34A, 34B, respectively. Consequently, the bus bar 40 is locked into the bus bar housing portion 32 in the housed state. The details of the housed state of the bus bar 40 into the bus bar housing portion 32 are illustrated by the cross-sectional views in FIGS. 8 to 11.

By assembling the connection module 20 formed in this manner to an upper part of the energy storage element group 10, an energy storage module M1 as shown in FIG. 1 can be obtained. At this time, using the contraction of the hinge 31 of the connection module 20, the electrode terminals 13 of the energy storage element group 10 are inserted through the terminal insertion holes 42 of the bus bar 40, and thrededly engaged by the nuts 14. At this time, in the connection module 20 of the present embodiment, the gap SP between the bus bar holding portion 30 is wide, and the contraction amount of the hinges 31 is large, thus facilitating the assembly of the connection module 20 to the energy storage element group 10.

5. Effects of the Present Embodiment

The adjacent bus bar holding portions 30 are coupled by the hinge 21 (pitch adjustment portion) that extends and contracts in the holding portion arrangement direction (the arrow X direction in FIG. 4). That is, the hinge 21 is provided in correspondence to each of the bus bars. More preferably, the hinge 21 is provided between the bus bars, except for the bus bars related to the unit coupling portion 22. The bus bar housing portion 32 includes, on one side (in the present embodiment, the right side in FIG. 4) in the holding portion arrangement direction, the free portion 32S where there is no isolation wall. That is, in each of the bus bar housing portions 32, one side wall (the side wall on the right side in FIG. 4: the side wall on the X1 direction side of the arrow X) of the two side walls opposed to the side walls (isolation walls) of the other adjacent bus bar housing portions 32 is not provided. Consequently, the gap SP between the adjacent bus bar housing portions can be increased by an amount corresponding to the thickness of the side wall. By increasing the gap SP, it is possible to increase the extension/contraction amount of the hinge 21, or in other word, the adjustment amount of the inter-electrode pitch. Accordingly, with the connection module 20 of the present embodiment, it is possible to increase the pitch adjustment amount for each bus bar holding portion 30, or in other words, for each bus bar 40, by a simple structure in which one side wall of the bus bar housing portion 32 is omitted. More specifically, it is possible to increase the pitch adjustment amount between the bus bars.

Each of the bus bar housing portion 32 can be formed by the first to third side walls into a U-shape that is open on one side (the right side in FIG. 4) in the holding portion arrangement direction in plan view. That is, a bus bar housing portion 32 including a free portion 32S and capable of housing a bus bar 40 having a rectangular shape in plan view can be suitably formed.

The hinges 21A, 21B (pitch adjustment portion) are provided at locations in the vicinity of the gap SP between the bus bar holding portions 30 of the bottom portions 35 of the adjacent bus bar holding portions 30, across the gap SP. Accordingly, it is possible to make maximum use of the extension/contraction operation of the hinges 21A, 21B. This can reliably increase the pitch adjustment amount as compared with when two side walls that are opposed to the housing walls of the other adjacent bus bar housing portions are provided.

By the pair of cut-out portions 41 (engaging portion) of the bus bar 40 being engaged with the first fixed locking pawl 34A and the second fixed locking pawl 34B (movement limiting portion) formed on the first isolation wall 32A and the second isolation wall 32B, the movement (i.e., the movement in the horizontal direction) of the bus bar 40 to the free portion 32S side where the isolation wall of the bus bar housing portion 32 is not formed is limited. This prevents the detachment of the bus bar 40 from the bus bar housing portion 32 during transport of the connection module 20. Since the movement of the bus bar 40 is limited, the operation of attaching the bus bar 40 to the electrode terminal 13 is facilitated, improving the efficiency of the operation.

Other Embodiments

The present invention is not limited to the embodiment described by the above statements and drawings, and, for example, the following embodiments also fall within the technical scope of the present invention.

(1) The above embodiment shows an example in which each of the bus bar housing portions 32 is formed in a U-shape that is open on one side (the right side in FIG. 4) in the holding portion arrangement direction in plan view by the first to third side walls 32A, 32B, 32C. However, the shape of the bus bar housing portion 32 is not limited thereto. For example, the bus bar housing portion 32 may be formed in a U-shape that is open on the other side (the left side in FIG. 4) in the holding portion arrangement direction in plan view. Alternatively, the bus bar housing portion 32 may be formed in accordance with the planar shape of the bus bar 40, for example, in a U-shape that is open on one side in the holding portion arrangement direction in plan view. The bus bar housing portion 32 may have any shape as long as it includes, on one side (the arrow X direction in FIG. 4) in the holding portion arrangement direction, the free portion 32S where there is no isolation wall.

(2) The above embodiment shows an example in which the pitch adjustment portion is formed by the hinges 21A, 21B provided at locations in the vicinity of the gap SP between the bus bar holding portions 30 of the bottom portions 35 of the adjacent bus bar holding portions 30, across the gap SP. However, the present invention is not limited thereto. For example, the hinge 21 may be provided one of locations in the vicinity of the gap SP between the bus bar holding portions 30 of the bottom portions 35 of the bus bar holding portions 30. The pitch adjustment portion may not necessarily be a hinge as long as it couples adjacent bus bar holding portions 30, and extends and contracts in the holding portion arrangement direction (the arrow X direction in FIG. 4), enabling adjustment of the pitch between the electrode terminals 13A, 13B of the positive and negative electrodes of the adjacent energy storage elements 11.

(3) The above embodiment shows a configuration in which the first side wall 32A and the second side wall 32B include the first fixed locking pawl 34A and the second fixed locking pawl 34B (movement limiting portion) that are disposed on the third isolation wall side relative to the center part in the holding portion arrangement direction, and that limit the movement of the bus bar 40, and the bus bar 40 includes the pair of cut-out portions 41 (engaging portion) for being engaged with the first fixed locking pawl 34A and the second fixed locking pawl 34B. However, the present invention is not limited thereto. For example, one of the first fixed locking pawl 34A and the second fixed locking pawl 34B may be provided as the movement limiting portion, and the cut-out portion 41 may be provided in one location of the bus bar 40 accordingly. The movement limiting portion is not limited to the fixed locking pawl 34, and the engaging portion is not limited to the cut-out portion 41. Furthermore, the movement limiting portion and the engaging portion may not be provided.

LIST OF REFERENCE NUMERALS

10 Energy storage element group
11 Energy storage element
13A Positive electrode terminal
13B Negative electrode terminal
20 Connection module
30 Bus bar holding portion
32 Bus bar housing portion
32A First side wall (first isolation wall)
32B Second side wall (second isolation wall)
32C Third side wall (third isolation wall)
34A First fixed locking pawl (movement limiting portion)
34B Second fixed locking pawl (movement limiting portion)
35 Bottom portion of bus bar holding portion
35A Central mounting portion (bottom portion)
35B End portion mounting portion (bottom portion)
40 Bus bar
41 Cut-out portion (engaging portion)

What is claimed is:

1. A connection module to be attached to an energy storage element group in which a plurality of energy storage elements including positive and negative electrode terminals are lined up, the connection module comprising:
   a plurality of bus bars that connects the positive and negative electrode terminals of adjacent energy storage elements of the plurality of energy storage elements;
   a plurality of bus bar holders that are lined up in a line-up direction in which the plurality of energy storage elements are lined up, holding the bus bars so as to be insulated; and
   a pitch adjustment coupler that is provided across adjacent bus bar holders of the plurality of bus bar holders so as to couple the adjacent bus bar holders, and the pitch adjustment coupler is configured to extend and contract in the line-up direction of the plurality of bus bar holders, enabling adjustment of a pitch between the positive and negative electrode terminals of the adjacent energy storage elements,
   wherein each of the bus bar holders includes a bus bar housing including an isolation wall that keeps the corresponding bus bars apart and insulated from one another, and
   the bus bar housing includes, on one side in the line-up direction, a free space where there is no isolation wall.

2. The connection module according to claim 1, wherein each of the bus bar holders includes a bottom portion on which the corresponding bus bar is placed,
   each of the bus bars is formed in a rectangular shape in plan view,
   each of the bus bar housings is formed in a U-shape that is open on said one side in the line-up direction in plan view, and
   the isolation wall includes:
   a first isolation wall provided upright on the bottom portion and extending in the line-up direction of the plurality of bus bar holders;
   a second isolation wall provided upright on the bottom portion so as to be opposed to the first isolation wall, and extending in the line-up direction; and
   a third isolation wall coupled to one end portion of the second isolation wall, and extending in a direction orthogonal to the line-up direction, from the one end portion of the second isolation wall toward one end portion of the first isolation wall, and
   there is no isolation wall on a side opposed to the third isolation wall.

3. The connection module according to claim 2, wherein a gap is provided between adjacent bus bar housings of the plurality of bus bar housings, and
   the pitch adjustment coupler is formed in a location, in a vicinity of the gap, of the bottom portions of the adjacent bus bar holders by a hinge provided across the gap.

4. The connection module according to claim 2, wherein at least one of the first isolation wall and the second isolation wall includes a movement limiting engagement that limits movement of the bus bar and is disposed on a side of the third isolation wall relative a center part in the line-up direction, and
   the bus bar includes an engaging structure to engage with the movement limiting engagement.

5. The connection module according to claim 1, wherein the free space is disposed between adjacent bus bars of the plurality of bus bars in the line-up direction.

6. The connection module according to claim 5, wherein the free space overlaps with the pitch adjustment coupler in a direction perpendicular to the line-up direction.

7. The connection module according to claim 1, wherein the isolation wall includes an opening through which a portion of the corresponding bus bar is disposed, and the opening is separate from the free space.

8. The connection module according to claim 1, wherein the pitch adjustment coupler includes a plurality of pitch adjustment couplers that overlap in a direction perpendicular to the line-up direction.

9. The connection module according to claim 1, wherein the pitch adjustment coupler includes a plurality of pitch adjustment couplers, and the free space overlaps with the plurality of pitch adjustment couplers in a direction perpendicular to the line-up direction.

10. The connection module according to claim 1, wherein the pitch adjustment coupler overlaps with the isolation wall in the line-up direction.

* * * * *